Feb. 17, 1942.　　　K. W. COUSE　　　2,273,503
LOW FLOOR LEVEL TRAILER
Filed Dec. 5, 1940　　　3 Sheets-Sheet 2
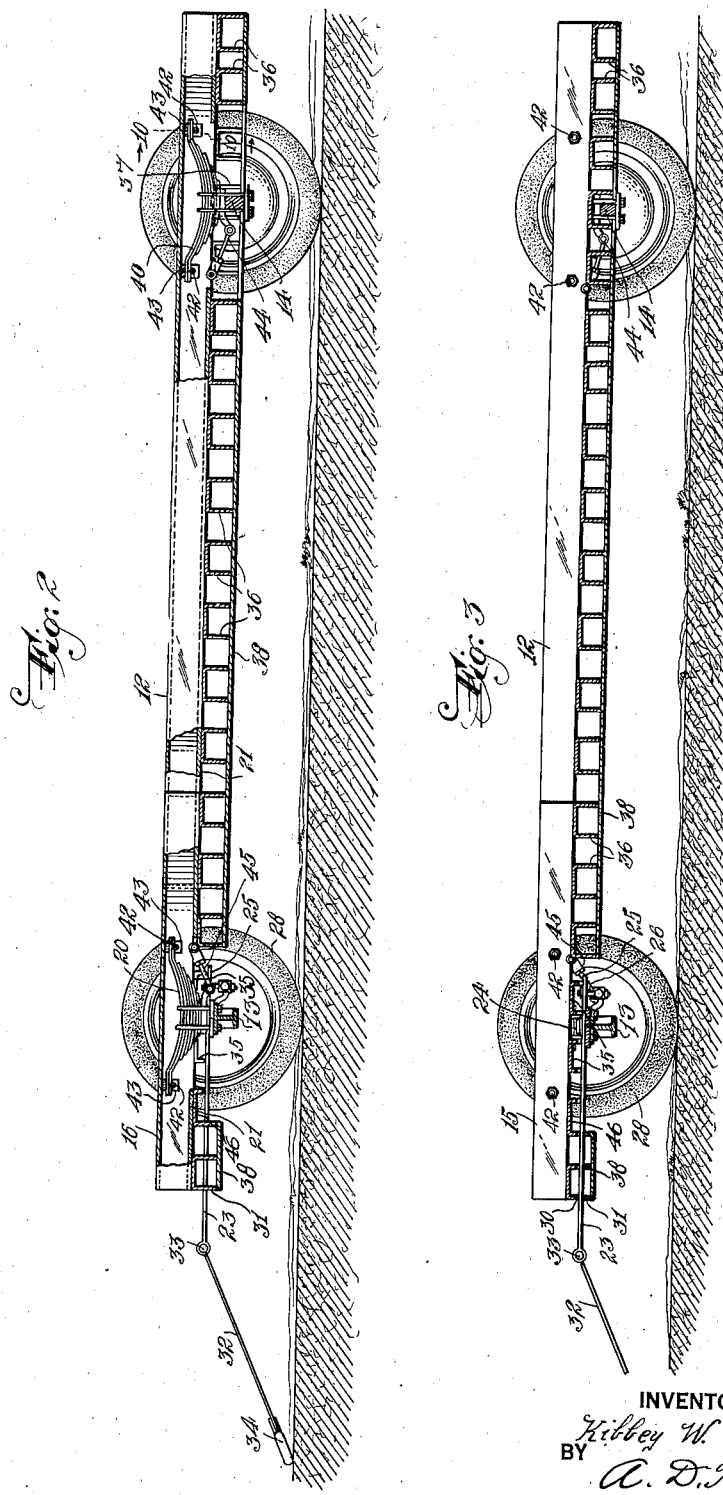
INVENTOR
Kibbey W. Couse
BY
A. D. T. Libby
ATTORNEY Feb. 17, 1942.  K. W. COUSE  2,273,503
LOW FLOOR LEVEL TRAILER
Filed Dec. 5, 1940  3 Sheets-Sheet 3
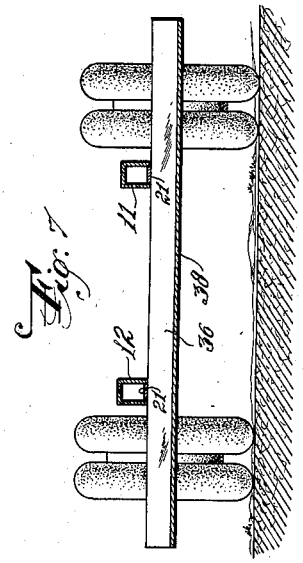
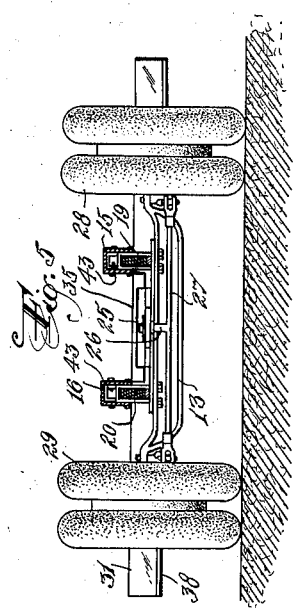
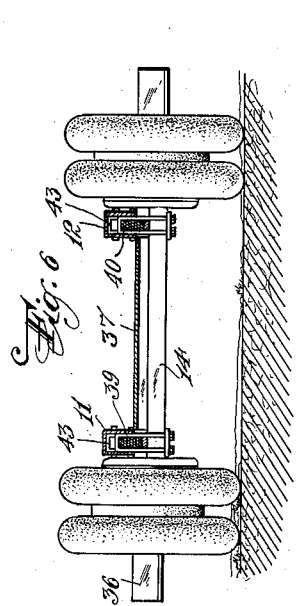
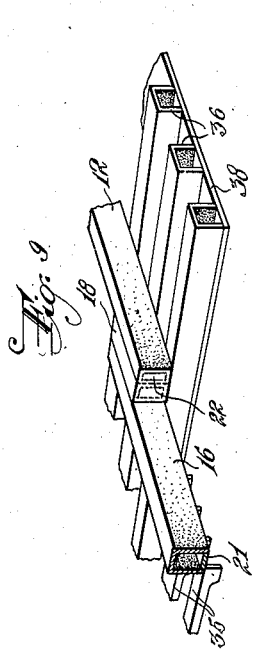
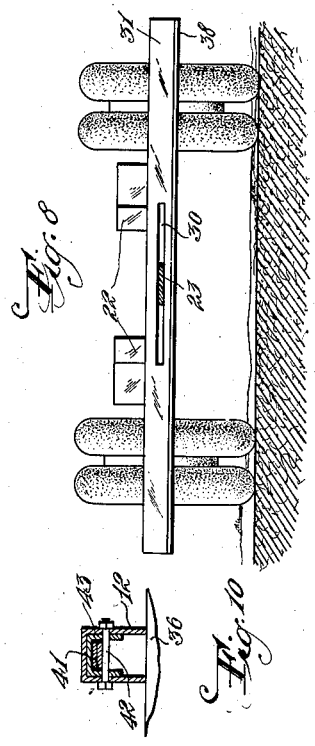
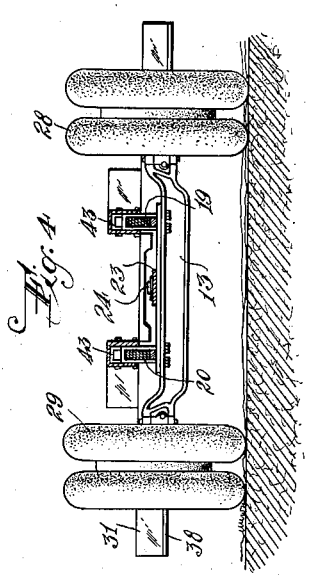
INVENTOR
Kibbey W. Couse
BY
A. D. T. Libby
ATTORNEY Patented Feb. 17, 1942

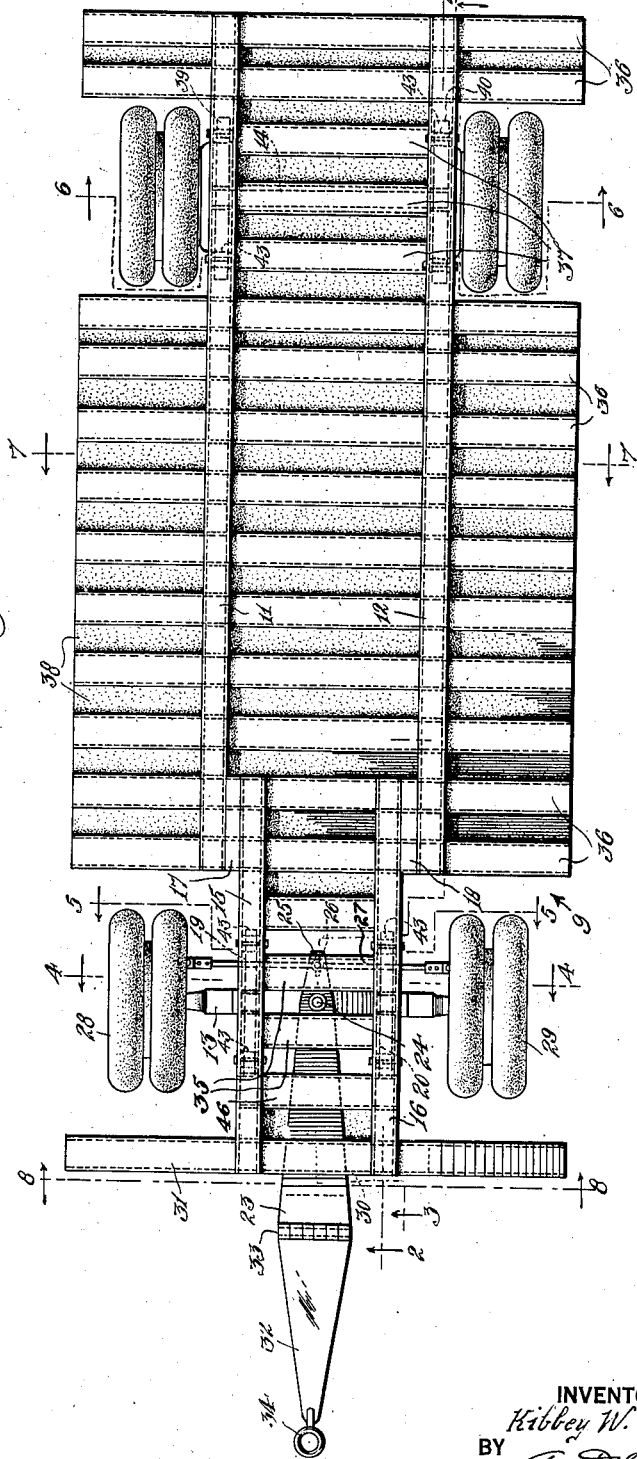

2,273,503

UNITED STATES PATENT OFFICE 2,273,503

LOW FLOOR LEVEL TRAILER

Kibbey W. Couse, Newark, N. J.

Application December 5, 1940, Serial No. 368,618

9 Claims. (Cl. 280—106.5)

This invention relates to a trailer which may be used for various purposes, depending on the type of super-structure which may be applied to the base portion which is shown and described herein.

One of the objects of my invention is to provide a type of trailer which has a low floor level and a smooth bottom which will allow the trailer to be pulled through mud and snow and over ditches and other obstructions with the least expenditure of energy.

Another object of my invention is to provide a framework for the trailer in which the springs are completely housed within members of the framework, thereby obtaining a maximum utilization of space, while at the same time being protected and presenting a streamline effect.

Other and further objects and advantages will be discerned from the following specification, taken in connection with the annexed drawings, wherein:

Figure 1 is a plan view of the trailer.
Figure 2 is a view on the line 2—2 of Figure 1.
Figure 3 is a view on the line 3—3 of Figure 1.
Figure 4 is a view on the line 4—4 of Figure 1.
Figure 5 is a view on the line 5—5 of Figure 1.
Figure 6 is a view on the line 6—6 of Figure 1.
Figure 7 is a view on the line 7—7 of Figure 1.
Figure 8 is a view on the line 8—8 of Figure 1.
Figure 9 is a fragmentary perspective view looking in the direction of the arrow 9 on Figure 1.
Figure 10 is a view on the line 10—10 of Figure 2.

In the various views wherein like numbers refer to corresponding parts, 11 and 12 are longitudinally extending channel irons extending from a point at the rear of the front axle 13, to a point beyond the rear axle 14. The front axle 13 carries supplemental extension channels 15 and 16 which are spaced laterally inwardly from the front ends of the main channel members 11 and 12 and welded thereto by spacing members 17 and 18. Instead of the offsets just described, the main channel irons 11 and 12 may have their forward ends bent or curved inwardly to come into the position over the front axle 13 occupied by the supplemental channel members 15 and 16; or the main channels 11 and 12 may be placed so as to extend directly through, but I prefer to have them spaced as widely apart as possible. However, to provide a space for the turning of the front axle, the construction shown has been used with good results.

As will be seen from Figures 2, 4 and 5, the front springs 19 and 20 are positioned within the side members of the supplemental channel members 15 and 16 and are fastened thereto by a fastening device which will be later described with respect to the rear springs. The channel members 11 and 12 and the supplemental members 15 and 16 are positioned with the channel opening downward, and these openings are closed by members 21, except where the springs are located, and the ends are also closed by plate members 22 welded to the ends of the supplemental channels 15 and 16. The ends of the cross-channels 36 are likewise covered by similar plate members 22.

A trailer bar 23 is pivotally attached at 24 to the front axle 13 and has one end 25 fastened by a pin 26 to a steering connecting rod 27 operatively attached to the front wheels 28 and 29. The forward end of the trailer bar 23 extends through a slot 30 in the front frame member 31 and has an extension 32 hinged to it at 33. The extremity of the extension 32 has a ring 34 for making attachment to the trailer bar. The bar 23 and extension 32 are made wide to act as a skid for assisting in going over obstructions.

Positioned between and welded to the supplemental frame members 15 and 16 are short cross-channels 35 having a narrow flange as shown in Figures 2 and 3. A special channel 46 extends across the channels 15 and 16 as shown in Figures 1, 2 and 3, and is welded thereto. Cross-channels 36 are welded to the main frame channels 11 and 12 between the front and rear wheels, and somewhat shorter channels 37 are welded to the members 11 and 12 between the opposite rear wheels.

Extending all the way across the bottoms of the channels 36, is a plate 38 of suitable material, preferably metal, such as steel, treated to prevent rusting and corrosion. Extensions of the plate 38 also pass on the bottoms of the cross-channels 35 and 37 so that all of the channels, including 31, are completely covered on the bottom. Where separate plates may be used for this covering purpose, they are welded together at the joints in such a way as to present a smooth, unbroken surface substantially over the entire bottom of the trailer, so that if the trailer should get into mud, snow or some ditch, this smooth bottom of large area will prevent the trailer, with its load, from becoming embedded in the snow, mud or ditch so as to prevent its being pulled out with the application of a reasonable amount of power. This bottom closure sheet or plate will be under tension when the platform is loaded and this adds greatly to the rigidity of the trailer.

The rear springs 39 and 40 are attached to the frame members 11 and 12 in a manner similar to the attachment of the front springs to the supplemental frame members 15 and 16. This attachment is shown on a somewhat enlarged scale in Figure 10, wherein one spring end 41 is illustrated. Two leaf ends 41 of the spring rest on a bolt 42 carried by the channel 12. The ends of the spring are positioned within a channel-shaped fitting 43, which also act as reinforcements for the channels. In this construction, the spring ends are free to move on the bolts 42. The torque reaction between the axle and the springs is taken up by the devices 44 at the rear axle, and the devices 45 at the front axle. Since these particular devices form no part of the present invention, they need not be described further herein.

While the cross-channels 35, 36 and 37 may be placed above the main channels 11 and 12 and supplemental channels 15 and 16, by placing them below as described a much lower floor level is obtained, thereby lowering the center of gravity of the device and making it more stable on the road. At the same time, this construction enables a smooth bottom to be built into the trailer as heretofore described.

By closing in the bottoms of the channels and their ends as described, water and dirt and other deleterious materials are prevented from getting into the cross-channels and main channels and thereby avoids all the detrimental effects which would follow if these channels were open. It may be noted in passing that the various channels may be made of any suitable material such as steel or alloys thereof, or alloys of aluminum to provide lightness and yet sufficient strength for the various purposes to which the trailer construction may be applied.

What I claim is:

1. In a low floor level trailer having, front and rear axles and wheels with draft means attached to the front end of the trailer, longitudinal frame members extending over said axles, cross-members carried in spaced relation by said longitudinal members along their length and means for covering the entire bottom of the trailer with a substantially smooth covering.

2. In a low floor level trailer having, front and rear axles and wheels with draft means attached to the front end of the trailer, longitudinal frame members extending over said axles, cross-members carried by said longitudinal members, on the under side thereof, means comprising a metal resistant to corrosion covering smoothly at least the greater part of the bottom of these under-positioned members.

3. In a low floor level trailer having, front and rear axles and wheels with draft means attached to the front end of the trailer, longitudinal channel members extending over said axles, springs housed entirely within said channels except for a small portion immediately over the axles and supporting said members on the axles, cross-members carried by said longitudinal members and means for covering at least the greater part of the bottom of all of said members with substantially a smooth covering.

4. In a low floor level trailer having, front and rear axles and wheels with draft means attached to the front end of the trailer, longitudinal channel members extending over said axles, springs housed entirely within said channels except for a small portion immediately over the axles and supporting said members on the axles and channel cross-members fastened to said longitudinal members on the under sides thereof.

5. In a low floor level trailer having, front and rear axles and wheels with draft means attached to the front end of the trailer, longitudinal channel members extending over said axles, springs housed entirely within said channels except for a small portion immediately over the axles and supporting said members on the axles, channel cross-members fastened to said longitudinal members on the under sides thereof and with their open parts downward and at least a covering having a smooth surface over the greater part of the open channels.

6. In a low floor level trailer having, front and rear axles and wheels with draft means attached to the front end of the trailer, longitudinal channel members extending over said axles, spaced cross-channels having their webs next to and fastened to the under side of said longitudinal channels, springs fastened to the axles and positioned entirely within said longitudinal channels except for a small portion immediately over the axles and having their ends slidably supporting the channels, a cover means for the under cross-channels and closure means for the ends of all the channels.

7. In a low floor level trailer having front and rear axles and wheels, the wheels having a steering rod associated therewith, with a draft bar pivoted on the front axle and having one end operaitvely connected to said rod; longitudinal channel members extending over said axles, springs housed entirely within said channels except for a small portion immediately over the axles and supporting said channel members on the axles, spaced cross-channels fastened to the longitudinal channels along the entire length of the longitudinal channels, and a smooth cover means for at least the greater part of the whole underside of the structure.

8. In a sub-structure for a trailer having front and rear axles with wheels therefor with means for attaching a draft bar to the front of the structure, a plurality of spaced longitudinal channels extending across the axles, cross-channels fastened to the longitudinal channels in spaced relation along their length and on the under sides thereof and means comprising a metal resistant to corrosion for covering the bottom portions of these under-positioned channels with a smooth covering.

9. In a sub-structure for a trailer having front and rear axles with wheels therefor with means for attaching a draft bar to the front of the structure, a plurality of spaced longitudinal channels extending across the axles, springs mounted on the axles and positioned entirely within their respective channels except for a small portion immediately over the axles and supporting the same, cross-channels fastened to the longitudinal channels in spaced relation along their length and on the under sides thereof and means for covering these under-positioned channels with a smooth covering.

KIBBEY W. COUSE.